United States Patent
Gädke et al.

(10) Patent No.: US 9,915,309 B2
(45) Date of Patent: Mar. 13, 2018

(54) DRUM BRAKE MODULE WHICH CAN BE OPERATED BY ELECTRIC MOTOR

(71) Applicant: Continental Teves AG & Co. oHG, Frankfurt (DE)

(72) Inventors: Martin Gädke, Hofheim/Ts. (DE); Uwe Bach, Niedernhausen (DE); Stephan Becker, Badenhelm (DE); Volker van Aken, Niddatal (DE); Holger von Hayn, Bad Vllbel (DE); Jens Hoffmann, Darmstadt (DE); Ahmed Sefo, Frankfurt (DE); Wolfgang Ritter, Oberursel/Ts. (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/100,023

(22) PCT Filed: Nov. 18, 2014

(86) PCT No.: PCT/EP2014/074836
§ 371 (c)(1),
(2) Date: May 27, 2016

(87) PCT Pub. No.: WO2015/082206
PCT Pub. Date: Jun. 11, 2015

(65) Prior Publication Data
US 2017/0009832 A1     Jan. 12, 2017

(30) Foreign Application Priority Data

Dec. 6, 2013   (DE) ........................ 10 2013 225 166
Mar. 14, 2014  (DE) ........................ 10 2014 204 769

(51) Int. Cl.
*F16D 65/22*     (2006.01)
*F16D 51/22*     (2006.01)
(Continued)

(52) U.S. Cl.
CPC ............. *F16D 65/22* (2013.01); *F16D 51/22* (2013.01); *F16D 65/0006* (2013.01);
(Continued)

(58) Field of Classification Search
CPC ........ F16D 65/22; F16D 51/22; F16D 65/006; F16D 2121/24; F16D 2125/40;
(Continued)

(56) References Cited

U.S. PATENT DOCUMENTS 2,193,975 A * 3/1940 Main .................. F16D 51/50
                                                  188/327
2,259,266 A   10/1941 Rabe
(Continued)

FOREIGN PATENT DOCUMENTS

DE         696200       3/1941
DE        1022920       1/1958
(Continued)

OTHER PUBLICATIONS

German Search Report for German Application No. 10 2014 204 769.2, dated Apr. 3, 2017, including partial English translation, 8 pages.
(Continued)

*Primary Examiner* — Melanie Torres Williams
(74) *Attorney, Agent, or Firm* — RatnerPrestia

(57) ABSTRACT

An expansion device for drum brakes, which is floatingly and approximately centrally arranged between two substantially symmetrical brake shoes, the expansion device including at least two gear levers articulated to each other and each supported on a brake shoe, at least one of the gear levers of the expansion lock being coupled to an actuating element of an actuator system such that the brake shoes carry out an even, translationally directed expanding movement, which is converted by a gearing, in the direction of the brake drum.
(Continued)

At least one of the gear levers of the spreader lock has a spring element integrated into it that can be elastically reversibly deformed by a brake application force about a defined elasticity ΔS of at least 1 mm in a defined manner.

17 Claims, 6 Drawing Sheets

(51) Int. Cl.
    *F16D 65/00*      (2006.01)
    *F16D 121/24*      (2012.01)
    *F16D 125/40*      (2012.01)
    *F16D 125/62*      (2012.01)
    *F16D 125/68*      (2012.01)

(52) U.S. Cl.
    CPC ...... *F16D 2121/24* (2013.01); *F16D 2125/40* (2013.01); *F16D 2125/62* (2013.01); *F16D 2125/68* (2013.01)

(58) Field of Classification Search
    CPC .. F16D 2125/64; F16D 2125/68; F16D 51/48; F16D 51/50
    See application file for complete search history.

(56) References Cited

U.S. PATENT DOCUMENTS

| | | | |
|---|---|---|---|
| 5,529,149 A | | 6/1996 | Johannesen et al. |
| 6,321,889 B1* | | 11/2001 | Maehara ............... F16D 51/48 |
| | | | 188/325 |
| 6,408,994 B1 | | 6/2002 | Maehara |
| 6,412,609 B2 | | 7/2002 | Asai |
| 8,925,692 B2 | | 1/2015 | Funke |
| 9,175,737 B2 | | 11/2015 | Bach |
| 2001/0004035 A1 | | 6/2001 | Asai |
| 2002/0084153 A1 | | 7/2002 | Maehara |
| 2006/0144658 A1* | | 7/2006 | Tessitore ............... F16D 51/20 |
| | | | 188/325 |
| 2007/0151818 A1* | | 7/2007 | Linhoff ................. F16D 51/48 |
| | | | 188/326 |
| 2013/0153349 A1 | | 6/2013 | Akada et al. |

FOREIGN PATENT DOCUMENTS

| | | | |
|---|---|---|---|
| DE | 7407338 U | 6/1974 | |
| DE | 4129919 | 3/1993 | |
| DE | 19802082 | 7/1999 | |
| DE | 19826785 | 12/1999 | |
| DE | 102004039479 | * 2/2006 | ............ F16D 65/22 |
| DE | 102012201579 | 8/2012 | |
| EP | 0594233 | 12/1995 | |
| EP | 1054179 A2 | 11/2000 | |
| JP | 2001173694 A | 6/2001 | |
| JP | 2002206574 A | 7/2002 | |
| JP | 2002317837 A | 10/2002 | |
| WO | 2009030726 | 3/2009 | |
| WO | 2012104395 | 8/2012 | |

OTHER PUBLICATIONS

Japanese Notice of Reasons for Refusal for Japanese Application No. 2016-536721, dated Mar. 29, 2017, including English translation, 7 pages.

International Search Report and Written Opinion of the International Searching Authority for International Application No. PCT/EP2014/074836 dated Jun. 29, 2015.

* cited by examiner

DRUM BRAKE MODULE WHICH CAN BE OPERATED BY ELECTRIC MOTOR

CROSS REFERENCE TO RELATED APPLICATIONS

This application is the U.S. National Application No. PCT/EP2014/074836, filed Nov. 18, 2014, which claims to German Patent Application No. 10 2013 225 166.1, filed Dec. 6, 2013 and German Patent Application No. 10 2014 204 769.2, filed Mar. 14, 2014, the contents of such applications being incorporated by reference herein.

FIELD OF THE INVENTION

The present invention relates to a motor vehicle drum brake module which can be operated by electric motor.

BACKGROUND OF THE INVENTION

Drum brake modules of the type in question comprise an electromechanical actuator, which is secured on an outer side of the anchor plate, for driving a rotation-translation converter for converting a rotary drive motion into a translational actuating motion (B) of brake shoes, which are arranged on an inner side of the anchor plate, in a brake drum, said inner side facing away from the actuator, with the result that said shoes can perform an actuating motion in the direction of the brake drum, and wherein a lever-type expansion device is provided approximately centrally between the brake shoes, in particular for parking brake actuation.

A preassembled drum brake module having an expansion lever device (expansion lock), which locks when deenergized, including a spindle-nut mechanism on a rear side of an anchor plate for use in parking brake applications is known from DE 198 02 082 A1, which is incorporated by reference. Here, a force flow path is closed without losses since the expansion lever device is coupled directly to the electric motor and supported on the latter, and wherein the mechanism can contain rolling elements to increase efficiency. To ensure the required mobility when used with duo-servo brakes, the entire actuator subassembly is held flexibly on a rear side of a cover plate of the wheel brake. The system allows brake shoes of mirror-symmetrical design.

An electromechanically actuable duo-servo drum brake without control cable attachment is known from EP 594 233 B1, which is incorporated by reference. Here, an electric motor is arranged on a rear side of an anchor plate. The motor axis is arranged at right angles to an axis of rotation of a brake drum and drives a threaded spindle positioned rotatably and in an axially movable manner. The threaded spindle is provided parallel to the motor axis in the brake drum and is mounted in a housing. The threaded spindle is in engagement with an element which is mounted in an axially movable and non-rotatable manner in the housing and acts on a lever mechanism. In addition to an electric motor of relatively powerful construction, this design requires further components of very specific design and therefore does not permit simple variation in large-scale production.

In the case of particularly powerful drum brakes of the duo-servo parking-brake type, an expansion device serves to convert and distribute a translational stroke of an actuating element, which is imposed on the mechanism by the driver of the vehicle, for example, via a manually actuated brake lever or electromechanically via a central actuator (control-cable actuator), in such a way that two brake shoes are spread apart radially relative to one another with a corresponding force. As a consequence, the two brake shoes inevitably come into contact with a rotor (brake drum), and the braking forces are then introduced via a supporting block into an anchor plate fixed to the vehicle. Here, the expansion device is basically designed as a lever mechanism and comprises at least one rigid spring bridge of very high strength between the brake shoes, and an actuating lever, which is articulated thereto and on which an actuating element of the actuator system engages. DE 696 200 C1 and also DE 1 022 920 C1, which are incorporated by reference, in particular, disclose expansion devices of uniform stiffness which ensure, by purely structural means, that the lever mechanism cannot bend under the prevailing application forces. DE 10 2004 039 479 A1, which is incorporated by reference, also discloses that the expansion device/lever mechanism is to be designed to be as stiff as possible. An electromechanically actuable motor vehicle parking brake system with a conventional lever expansion mechanism in conjunction with a central or wheel-brake actuator system is disclosed by DE 41 29 919 A1, which is incorporated by reference.

WO2012/104395 A2, which is incorporated by reference, describes a drum brake module having an efficient, fixedly mounted wheel brake actuator having an integrated rotation-translation converter and no expansion lock. Thermal length changes in a drum brake can be compensated. For this purpose, an actuating lever is articulated at one end to one of the brake shoes, and wherein this actuating lever is coupled to an actuating element (control cable) of the actuator. This design requires special brake shoes.

WO 2009/030726 A1, which is incorporated by reference, discloses an electronic/slope-dependent application force adjustment system with an electronic control unit for the purpose of actuating an electromechanical duo-servo drum brake. Here, the expansion travel set is detected by the control unit by means of a travel sensor system, and the expansion device arranged within the drum incorporates the rotation-translation converter with the aid of a threaded nut/spindle arrangement and a spring energy storage device designed as a diaphragm spring pack. This spring energy storage device requires additional installation space.

SUMMARY OF THE INVENTION

An aspect of the present inventions makes available a universal, efficient and further-simplified drum brake module while using the installation space in an advantageous manner, said module being simple to maintain and adapted economically and yet variably to the uses and peculiarities of modern electric-motor wheel brake actuators.

According to an aspect of the invention and according to the first solution of the problem, a novel lever-type expansion device which is positioned so as to be elastically deformable in a specifically intended manner and so as to float between the brake shoes and functions even without electric travel sensors is provided for the first time. Accordingly, the invention departs from a basic design principle of the conventional lever-type expansion locks, according to which the lever-type expansion mechanism is basically inflexible. As a result, the special thermal expansion effects in a duo-servo drum brake can be compensated by purely structural means—without special electronic monitoring, i.e. without electric power and also in a fail-safe manner—at low cost. According to the invention, the elasticity is furthermore separated from the components of a brake shoe.

In another embodiment of the invention, a spring bridge or an actuating lever, articulated thereto, of the lever-type expansion device is designed to have a defined elastic flexibility in such a way that, under the prevailing application forces, said bridge or lever is deflected spring-elastically in a defined manner, i.e. performs a dual function as a spring energy storage device.

In another particularly advantageous embodiment of the invention, the elastic spring bridge/the actuating lever is embodied in an arc shape and can be deformed in the elastic range.

An additional independent solution of the problem consists in principle in that a housing of the electromechanical drum-brake wheel-brake actuator is elastically preloaded and can be moved longitudinally by a predetermined travel and is arranged on a brake carrier, such as, in particular, an anchor plate, so as to be guided parallel to the wheel axis. At least one preloaded spring is clamped between the actuator and the anchor plate, acting as a reservoir. For parallel guidance of the actuator, use is made of guide pins fixed to the wheel brake, which are accommodated in bushes arranged on the actuator. A reverse arrangement and kinematics of this guidance system is likewise possible. Here, stops limit the maximum movement travel of the actuator. One particular advantage of this solution is that modification of the flexibility for the purpose of adaptation to the respective vehicle application is made possible in a simple manner by changing and adjusting the spring system.

BRIEF DESCRIPTION OF THE DRAWINGS

Further details and features of the two inventions will become apparent from dependent claims in conjunction with the description with reference to the drawing.

In the drawing.

DETAILED DESCRIPTION OF THE DRAWINGS

Figure 7:
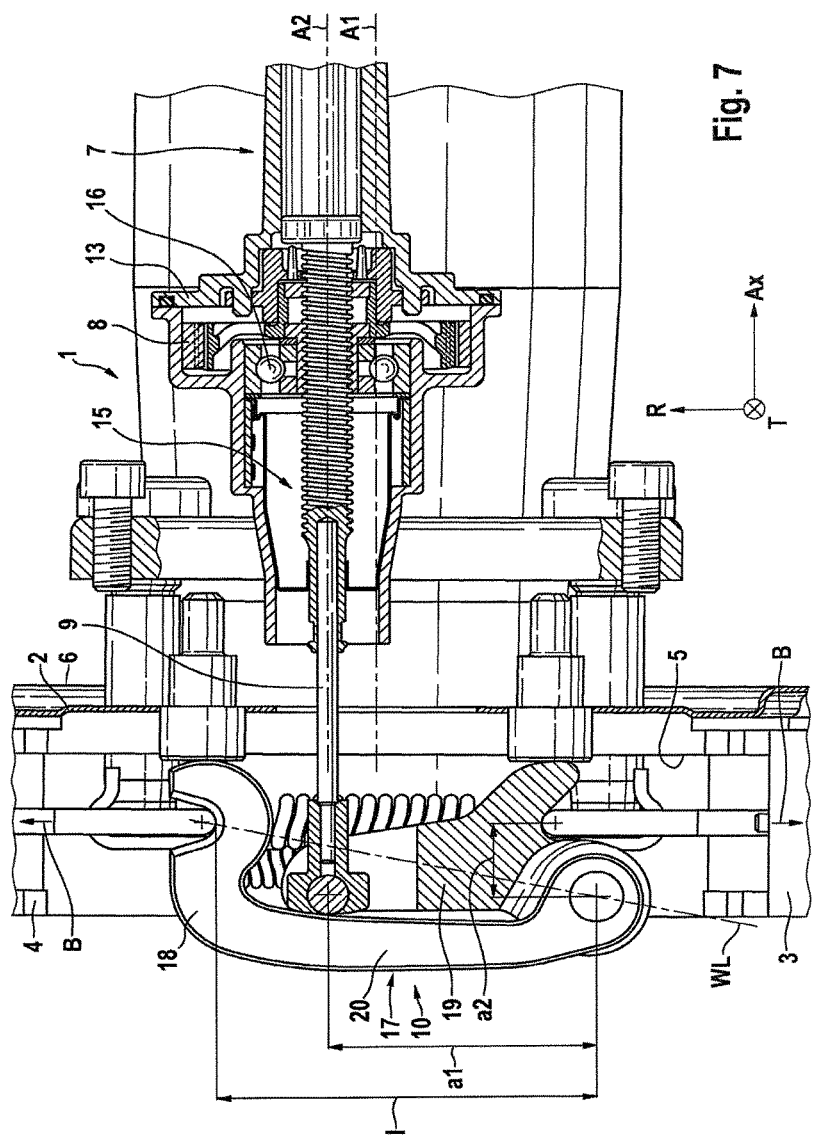
FIG. 7: shows the wheel brake actuator including the lever-type expansion device in longitudinal section, approximately to scale.
Figure 8:
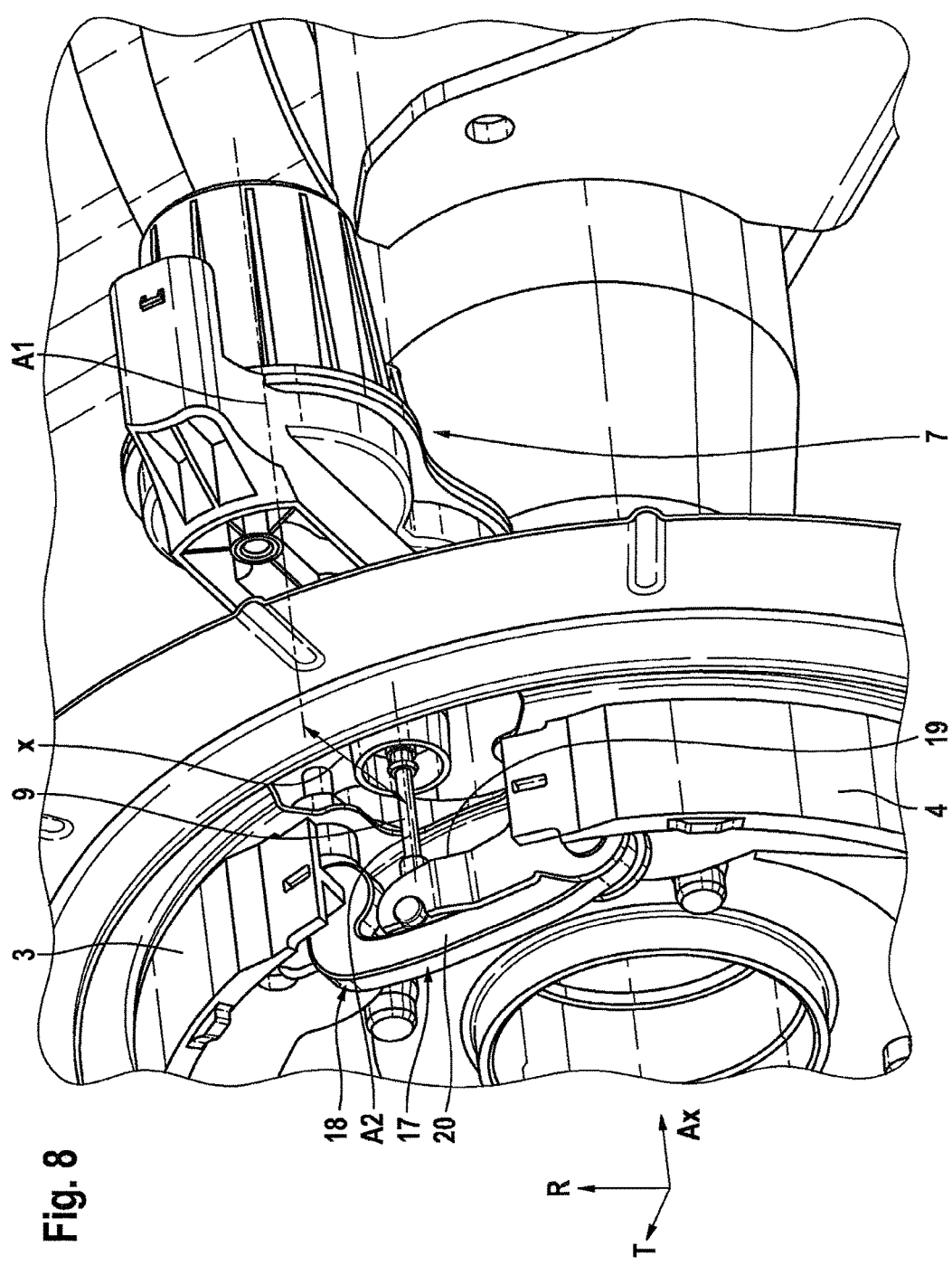
FIG. 8: shows details relating to the installation situation and articulation of the expansion device in perspective view.

According to FIG. 7, a drum brake module 1, which can be actuated by electric motor and is intended for arrangement on axle components of a motor vehicle, comprises an anchor plate 2 with brake shoes 3, 4 mounted movably thereon, which are provided within a brake drum 11 (partially indicated) on an inner side 5 of the anchor plate 2. Secured on a rear side/outer side 6 of the anchor plate 2 is an electric-motor-driven actuator 7, which engages in such a way on the brake shoes 3, 4 via a mechanism 8 and a downstream actuating element 9 (actuating cable) and via a lever-type expansion device (expansion lock) 10 inserted in a floating manner that said brake shoes 3, 4 can perform a translational actuating motion B in the direction of the brake drum 11 in order to perform a service and/or parking brake function. Here, the expansion device 10 is positioned approximately centrally on a center line M of the drum brake and in a floating manner between the brake shoes 3, 4, which are of substantially symmetrical design. In the duo-servo drum brakes, a supporting device ("supporting block") fixed to the anchor plate is also positioned between the brake shoes 3, 4, diametrically to the expansion device 10 positioned in a floating manner, said supporting device ultimately serving to support the braking forces after the electric-motor brake application and subsequent buildup of servo force (which is associated with the characteristic tightening process of the brake drum 11). The mechanism 12 of the electromechanical actuating system 7 comprises a mechanism housing 13, which carries an electric motor 14. The electric motor 14 consumes direct current and is commutated mechanically or electronically and is of a standard type that can be obtained inexpensively. An axis A1 of the motor 14 is arranged at a distance x from and parallel to an axis A2 of a spindle-nut arrangement 15. Common to all the embodiments or solutions is the fact that an interposed holder can be provided between the actuator 7 and the anchor plate 2 in order to allow simple matching and adaptation to different spatial and installation conditions in a motor vehicle. The holder is an integral component of the mechanism housing 13 or a separate component. Another peculiarity of all the solutions is that the actuator 7 is arranged counter to the direction of forward travel of a vehicle, i.e. preferably behind a wheel hub in relation to the direction of forward travel, e.g. in a three o'clock position relative to the wheel hub, and close to the anchor plate 2. This results in particularly good protection of the actuator 7 from environmental influences, such as weather and stone impact. The short overall length of the actuator 7 with a small overhang U (by virtue of the parallelism of the axes A1, A2) and flexibility, even if limited, of the actuating element 9 basically allow freely adaptable positioning on the anchor plate 2.

In this context, the drive and mechanism train has a multistage, in particular 2-stage gearwheel and/or belt and/or worm gear mechanism and/or planetary mechanism (hybrid combinations of the abovementioned types are possible and desired) as a torque converter of the reduction type. The actuator 7 includes a rotation-translation conversion by means of an integrated spindle-nut arrangement 15. In the mechanism train, a preferably two-stage wheel mechanism allows a reduction ratio in a range between about 7:1 and 25:1. If the downstream expansion device 10 allows a reduction ratio of about 4-6:1 between the brake shoes 3, 4, a total reduction ratio of about 125:1 is achieved. In addition, there is an additional reduction effect from the rotation-translation converter, allowing a further-increased total reduction ratio over the entire drive train. By virtue of this multistage mechanism train, the cost and power requirements on the electric motor 14 are significantly reduced.

The design of the actuator can be seen in a cross section in FIG. 7. Here, the actuator 7 is secured rigidly as a modular unit that can be handled separately on the rear side 6 of the anchor plate 2. The rotation-translation converter is integrated into the mechanism housing 13 as a spindle-nut arrangement 15. For this purpose, the spindle is guided without clearance in the mechanism housing 13 so as to be secure against rotation and movable smoothly and in translation.

As can also be seen from FIG. 7, the mechanism housing 13 is of multipart construction. The mechanism housing 13 accommodates the large number of component elements of the mechanism, which serve primarily for torque conversion (low input torque, high output torque) and can also enable an unpowered parking brake function by means of self-locking. Axes A1, A2 of motor and mechanism shafts are provided parallel to one another, while being offset at a distance X. At least certain mechanism components can at least partially comprise low-cost plastics material. Unpowered self-locking is preferably provided in the rotation-translation converter (spindle arrangement 15), ensuring that the remainder of the drive train, located on the motor side, is in principle very largely relieved of the application forces.

For those uses which involve a particularly effective, reduced-friction electromechanical braking function, there is a plurality of rolling elements (not shown) between a drive nut, in principle of metallic design, and a spindle, in principle of metallic design. In those variants which are released when deenergized, a parking brake function is made possible by a separate fixing, locking or blocking device. A particularly advantageous device is known from DE 19826785 A1, which is incorporated by reference, for example, the disclosure of which in respect of the principles of this fixing device is incorporated fully here.

The force flow path of the brake actuating force is as follows. Starting from the brake shoe 3, 4 and the actuating element 9, the application force passes via the spindle-nut arrangement 15 into the drive nut thereof. The drive nut is arranged rotatably in the mechanism housing 13 by means of a bearing 16 and is supported in an axially fixed manner on the rear side 6 of the anchor plate 2.

Figure 3:
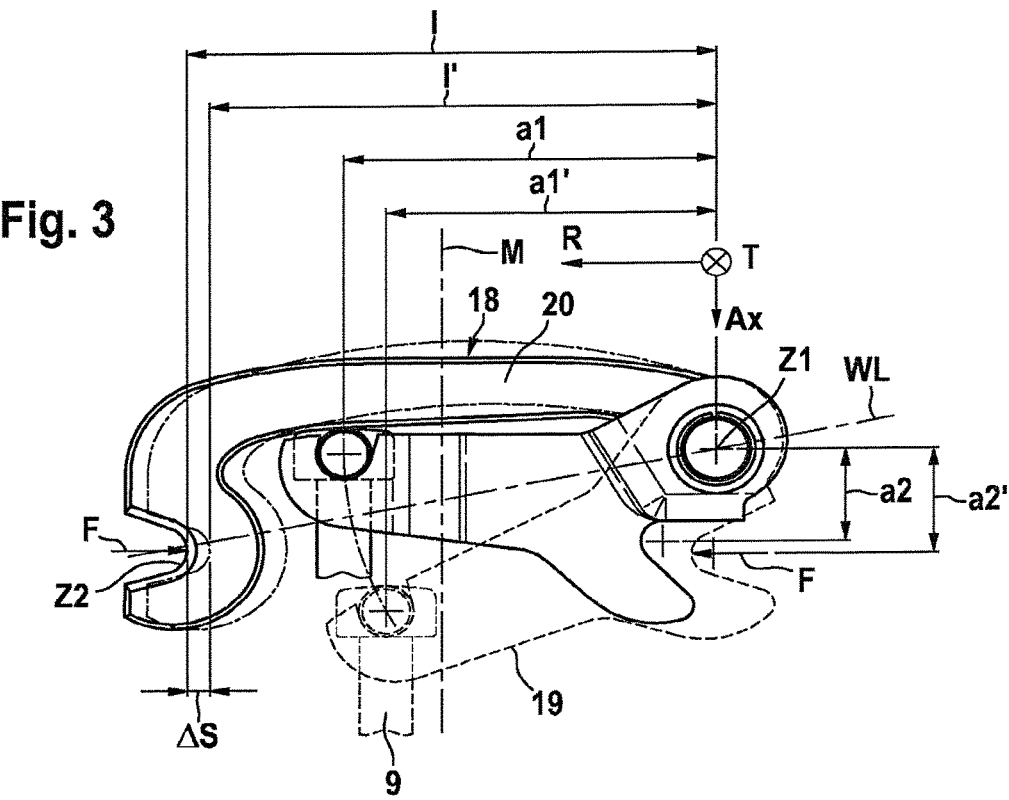
FIG. 3: shows an embodiment of the first solution to the problem in side view.
Figure 4:
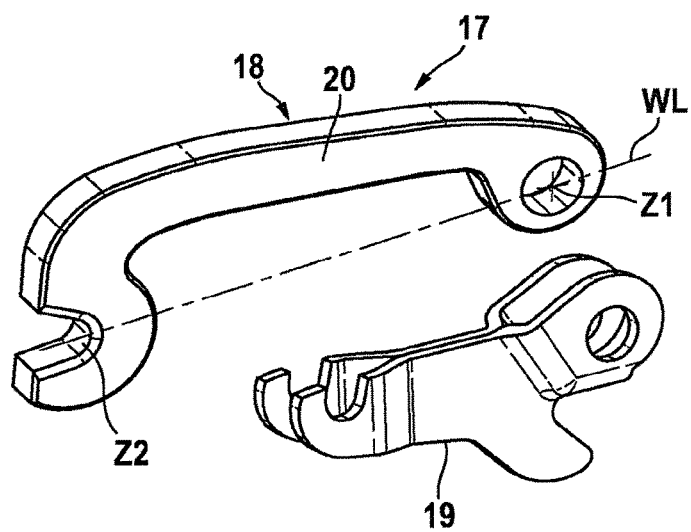
FIG. 4: shows an exploded drawing of the embodiment of the expansion device according to FIG. 3, FIG. 5: shows only a spring bridge from FIGS. 3 and 4 in the spring-elastically deformed state.
Figure 5:
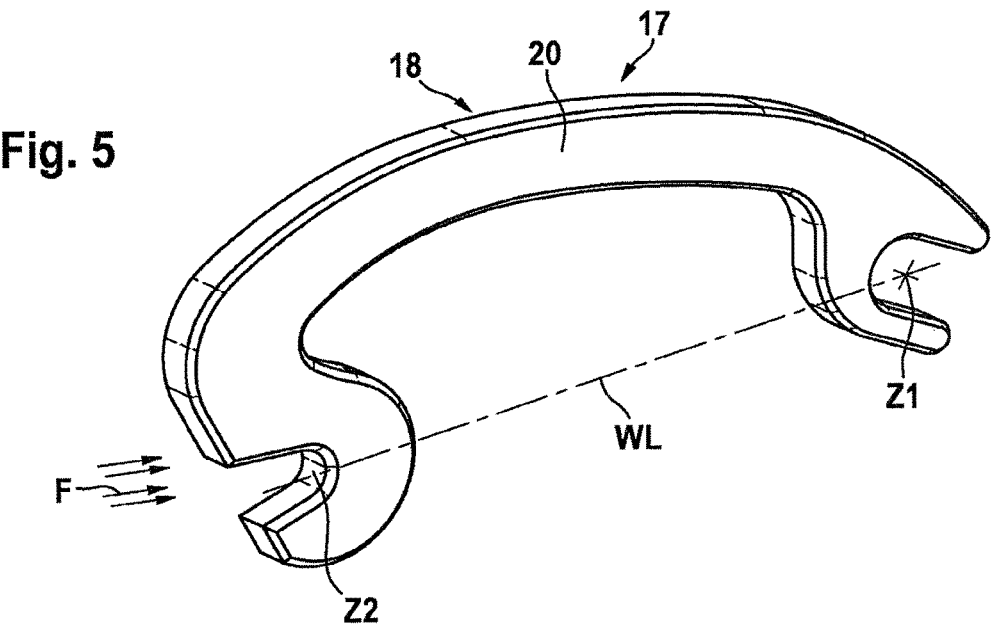
Figure 6:
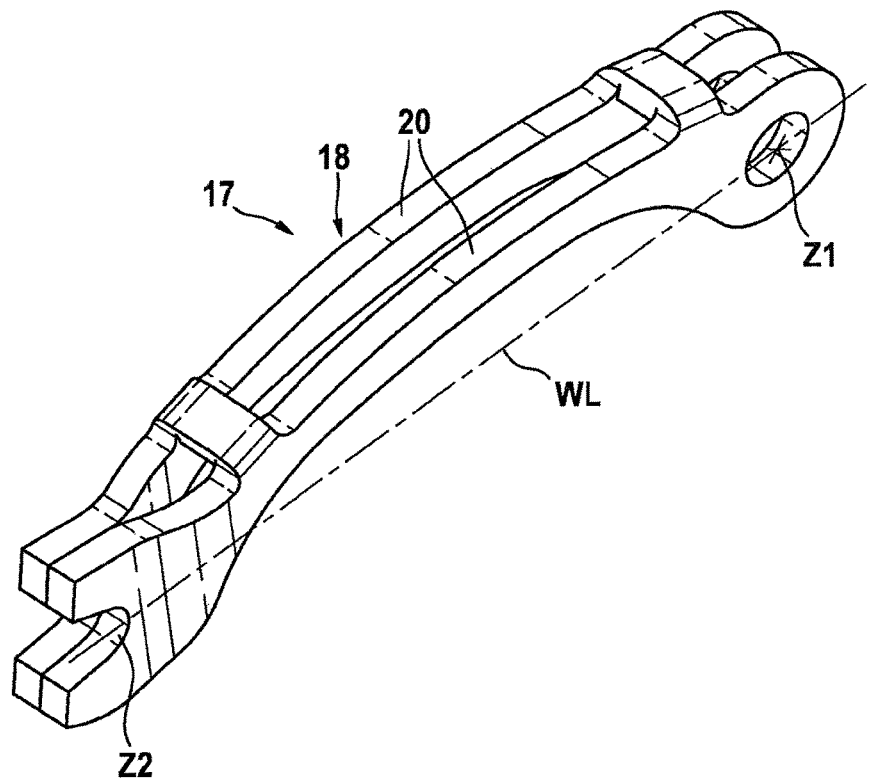
FIG. 6: shows the spring bridge embodied as a sheet-metal press-formed part.

Starting from this basic structure, the details of the novel lever-type expansion device 10 according to FIGS. 1 and 3-8 will be explored below. FIG. 3 illustrates details of the expansion device according to an aspect of the invention in the released state, while an actuated state is illustrated in broken lines. The lever-type expansion device 10 is arranged in the interior of the brake drum 11 on the inner side 5 of the anchor plate 2 and is actuated in translation by means of the actuating element 9. The transmission ratio i is geometrically defined substantially by the lever ratios a1/a2 on the actuating lever 19. Here, the multiplication effect thereof decreases because, as actuation progresses, the effective length of lever arm a1 is successively shortened, while the effective length of lever arm a2 successively increases. As a result, the expansion device 10 reduces and distributes the translational motion, introduced by the actuating element 9, uniformly and yet in a dynamic way between the two brake shoes 3, 4. Conversely, the expansion device 10 transmits the forces introduced with the mechanism efficiency i. The actuator 7 is energized in such a way that the brake shoes 3, 4 are applied to the brake drum 11 with a defined clamping force. Depending on the vehicle inclination, this application process is followed by an automatic tightening process with the servo effect, which takes place independently of the direction of rotation and secures the vehicle. Because thermal shrinkage of a drum brake system which has been parked while hot and has cooled down in the meantime requires protection against destruction, the lever-type expansion device 10 has an integrated spring means 17 (spring energy storage device) of defined elasticity, i.e. one which can be stressed reversibly, said spring means having a minimum elasticity of $\Delta S=\min.$ 1 mm. This elasticity simultaneously provides an application force reservoir and compensation of brake drum shrinkage processes. For the sake of a design which saves installation space, at least one component of the lever expansion device 10 is provided for this purpose with a dual function as a quasi-spring-elastic lever mechanism component. As is evident from the figure, the lever-type expansion device 10 has at least one spring bridge 18 and at least one actuating lever 19, which is articulated in a jointed manner to the spring bridge 18 and, for its part, is connected to the actuating element 9 of the actuating system 7. In this case, the pivoting axis of the levers of the expansion device 10 is aligned radially and arranged parallel to the center line M of the drum brake.

In the preferred embodiment, one limb of the lever component, spring bridge 18, is designed, as can be seen, as a bow or bending spring in the broadest sense in the form of an arc in accordance with the principles of an Euler-type buckling bar in order to obtain the desired spring action. In this case, the spring bridge 18 is subjected to buckling in its Hooke's range by the brake application forces and is accordingly plastically deformed (cf. FIG. 5). The characteristic of the spring means 17 is directly dependent on the bending moment of resistance, i.e. dependent on the bending resistance profile implemented by the spring limb 20. Consequently, the shaping and cross-sectional geometry of the spring limb 20 of the spring bridge 18 is preferably used to modify the spring properties thereof. A further influencing variable relates to the elasticity modulus of the material used for the spring limb 20. For this, at least said spring bridge 18 is preferably manufactured, like a flexible bending beam, entirely from a hard, spring-elastic steel material (tool steel or spring steel). In this case, the expansion device 10 is preferably produced initially by forming from sheet-metal material and then subjected to the necessary heat treatment and finally installed. Alternatively, a reinforced composite material can be used as an integrated spring means 17 by forming the entire lever from the composite material. It is obviously also possible for the actuating lever 19 to be designed as an elastic spring instead of or in addition to the spring bridge 18 without exceeding the scope of the invention. It is likewise conceivable to use other spring principles in the expansion device 10, e.g. the leg and/or torsion spring principle. It is possible to use a wire spring hoop.

Modular production is supported if the lever-type expansion device (expansion lock) 10 is designed as a subassembly (expansion device module) that can be handled separately, comprising the pivoting axes including the spring bridge 18 and the actuating lever 19.

As the figures show, the spring limb 20 of the spring bridge 18 extends substantially to one side of a line of action WL of force connecting the centers Z1, Z2 of the points of action of the force at the ends over the shortest possible distance.

By virtue of the dual function of the spring bridge 18, the structural integration of the spring means 17 into the lever advantageously requires no additional, special component elements, installation space, preloading elements or the like. The invention is therefore associated especially with the following advantages: the desired elasticity is enabled in a particularly low-cost manner without special brake shoes 3, 4 and also without special additional storage components, saving installation space. At the same time, the desired elastic application force reservoir is created. This integral elasticity eliminates the risk of destruction or non-releasable locking after a duo-servo drum brake has been parked while hot and has cooled down. Here, the elastic working capacity (application force reservoir) of the expansion lock according to the invention guarantees a legally required minimum application force without electric power and in a manner which is neutral in respect of installation space, even after the brake components involved have undergone a settling process. It is obvious that the expansion device according to the invention does not have to be used exclusively for drum brakes of the duo-servo type.

According to an aspect of the invention, the elastic expansion device 10 according to the invention allows systematic combination with a particularly sturdy, largely rigid electric wheel brake actuator, i.e. one which is of inelastic design.

According to an aspect of the invention, a lever-type expansion device/expansion lock 10 with integrated inherent elasticity in intelligent form is provided in that a desired force/displacement spring characteristic is provided integrally in a manner integrated into a mechanism lever. Thus, the novel expansion device 10, which primarily comprises two levers, a bearing block and one or more axes and, optionally, further adjoining components in the force flow path, simultaneously allows the desired (storage) spring property. In contrast, the adjoining components are largely of rigid design.

Positioning the coupling of the actuating element 9 symmetrically between the receptacles of the brake shoes 3, 4 in one embodiment of an expansion device 10 according to the invention makes it possible to assemble the expansion device 10 without specifying a direction. In other words, the drum brake module thereby meets the specifications that the actuator 7 is arranged in a manner positioned centrally between the receptacles for the brake shoes 3, 4.

As regards the manufacture of the expansion device 10, the primary proposal is that the spring bridge 18 of the expansion device 10 should be fine-blanked from a spring steel. In other respects, it is also possible for rigid parts of the expansion device 10 to be formed by connecting a plurality of steel sheets as it were in multiple layers (cf. welded actuating lever 19 in FIG. 4). Alternatively, the spring bridge 18 or the actuating lever 19 can be designed as a formed/stamped sheet-metal part.

Figure 1:
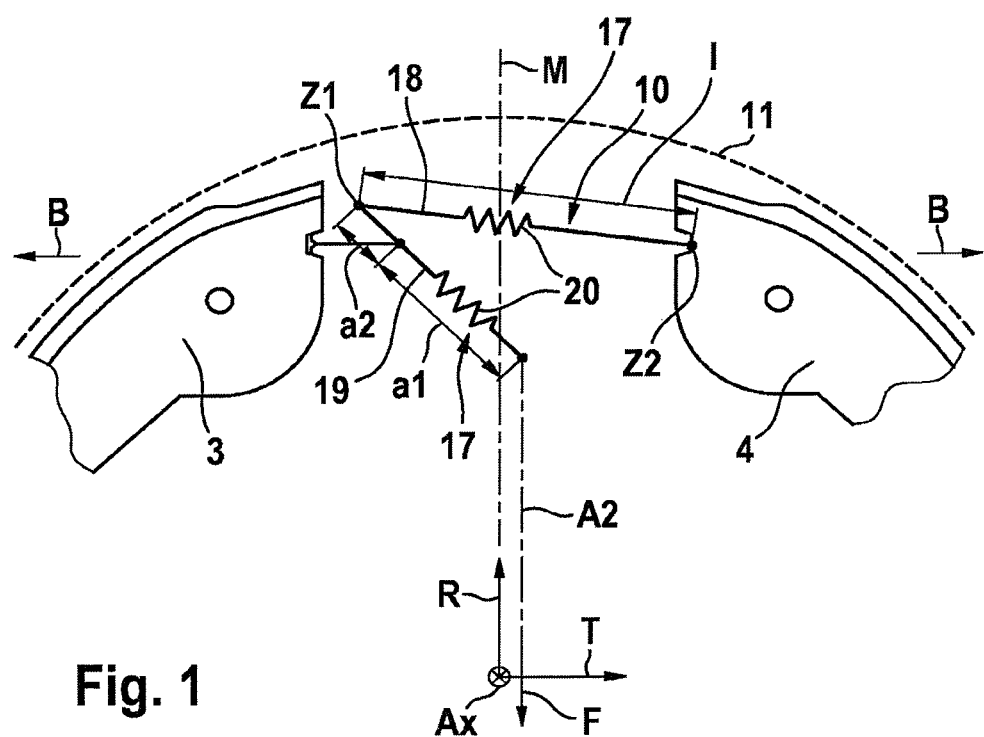
FIG. 1: shows the first solution to the problem schematically in principle.
Figure 2:
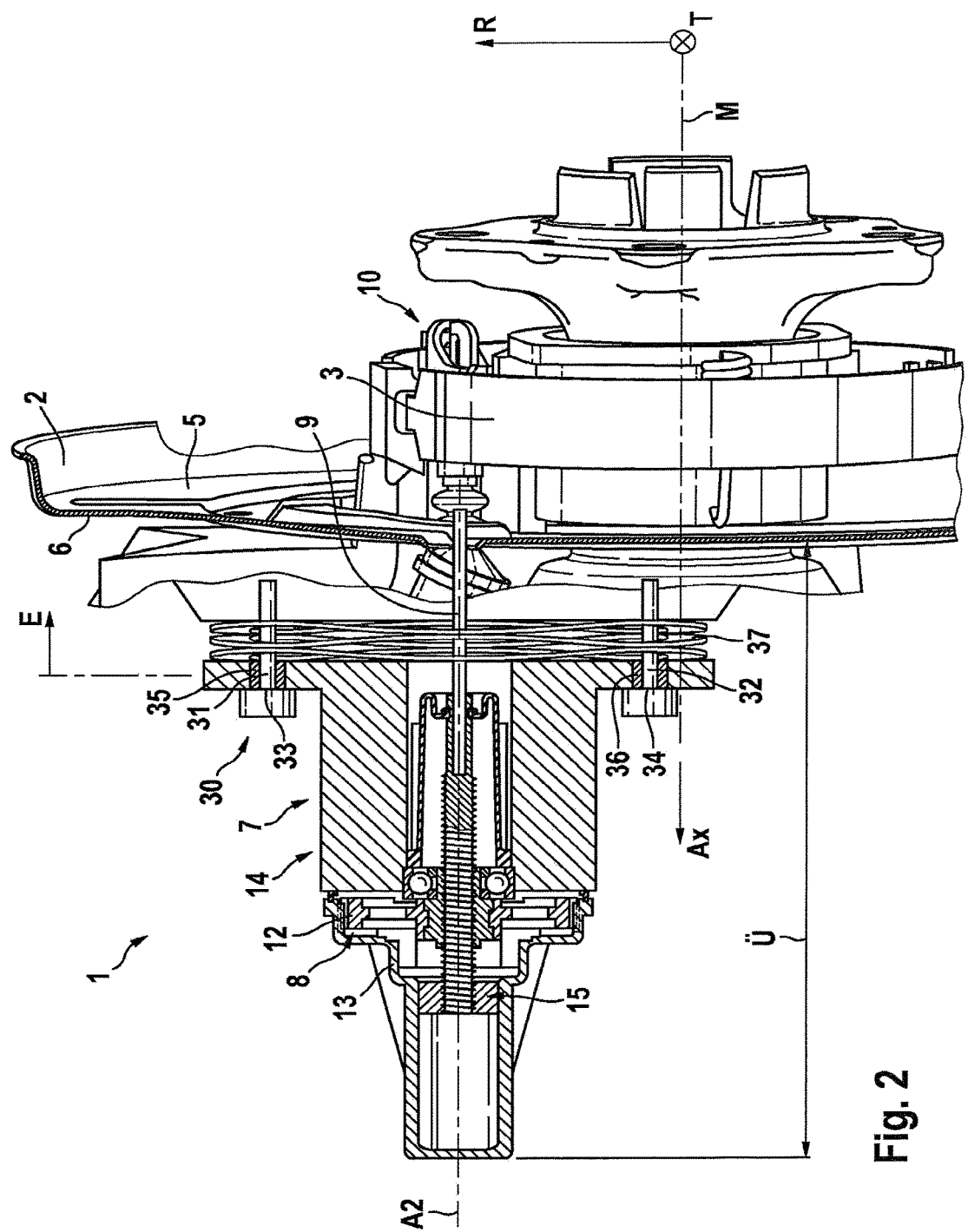
FIG. 2: shows the second solution to the problem in one embodiment.

To recap the advantages of the first solution:
energy-storing spring-elastic expansion device 10
simple modular assembly of the components
neutral in respect of installation space, spring property without additional installation space requirement
floating mounting, integration without modifying tried and tested components of the simplex/duo-servo brake
spread actuating stroke and, as a result, more precise control and regulation of the actuator 7
symmetrical-central connection between expansion device 10 and actuating element 9 of the actuator 7 is possible—extension of the actuating lever 19 is possible
wheel brake can be designed with point symmetry, also in respect of the brake shoes 3, 4—this allows a shared component strategy for the brake shoes 3, 4
largely hysteresis-free spring operation through direct application of Hooke's Law—the elasticity modulus is maintenance-free and can be specified in the design as a function of the material—therefore no dependence on lubricants as with diaphragm springs The additional independent solution according to FIG. 2 will be explored below. Here, the actuator 7 is basically of the same design as in FIG. 7, with the exception of its retention on the anchor plate 2. Therefore, only the fundamental differences are described below, while corresponding features in FIG. 2 are provided with corresponding reference numerals.

The actuator 7 is guided with the ability for limited movement parallel to the rear side 6 of the anchor plate 2 and is arranged in an elastically preloaded manner, i.e. with the ability for deflection, on the anchor plate 2. The parallel guide 30 can be formed by at least two guide pins 31, 32 with corresponding stops 33, 34, wherein an outside diameter of the guide pins 31, 32 is received movably in guide bushes 35, 36 or vice versa. In principle, the guide pins 31, 32 are arranged in a fixed manner on the anchor plate 2, and the actuator 7 or the housing thereof accommodates the guided bushes 35, 36. As an alternative, the guide pins 31, 32 can be arranged in a fixed manner on the actuator 7, while the guide bushes 35, 36 are arranged in a fixed manner on the anchor plate 2. Strict parallelism and freedom from friction in this parallel guide is important, as are stops 33, 34 dimensioned and positioned identically, to ensure that the maximum travel of the actuator 7 is uniformly limited and tilting in the guide is avoided. By way of example, the stops 33, 34 can be formed, in particular, by cams or screw heads. At least one spring means 37 is furthermore arranged in an elastically preloaded manner between the actuator 7 and the anchor plate 2. This spring means 37 is, for example, a disk-shaped wave spring, which has a particularly stiff force/deflection characteristic. To vary the characteristic, it is possible to insert a plurality of spring means 37 in series or in parallel in order to set the desired spring characteristic for different vehicle or brake applications. Provision can be made to use a plurality of wave springs with correspondingly identical or mutually differing spring characteristics in order to adapt the overall spring characteristic formed to the desired use. Depending on the design of the individual spring means 37 and the method of layering them, progressive or degressive characteristic components can be produced in this context. It is obvious that a conventional expansion device or, advantageously, an expansion device 10 according to the invention (cf. first solution to the problem) can additionally be provided in the system assembly.

The operation of the system is such that one or more elastically preloaded spring means 37 (preferably wave springs) are incorporated into a force flow path of the application forces between the anchor plate 2 and the actuator 7. The elasticity of this spring means 37 is such that sufficient reserve travel to compensate thermal shrinkage of a brake drum 11 is reserved for parking the vehicle while hot. In other words, thermal shrinkage of a brake drum 11 has the effect, in the state where the parking brake is applied, that the actuator 7 is acted upon elastically in arrow direction E toward the rear side 6 of the anchor plate 2.

Such attachment of the actuator 7 in a spring-elastic manner furthermore has an advantageous effect in avoiding noise emissions during the operation of the brake. The parallel guide system is preferably sealed, preventing contaminants from penetrating or entering interspaces. For reasons of synergy, the pin guide systems of the kind used in floating caliper disk brakes with the purpose of parallel guidance between a holder and a floating caliper can be used. An important requirement on all components, especially the spring means 37, is the fatigue-resistant design thereof, ensuring that it does not begin to flow or creep under load, i.e. that its spring characteristic does not simply change. This is advantageously ensured by using a metal wave spring. The wave spring can be adapted with little effort to the desired use through its geometric dimensioning, through the type of winding and through the choice of material.

As has been shown, both solutions according to the invention are based on spring means 17, 37 in order to compensate in an advantageous way for the peculiarities of the application and the cases of load in a particularly high-performance and electromechanically actuable duo-servo drum brake—without additional electronic systems or sensor systems.

1 drum brake module
2 anchor plate
3 brake shoe
4 brake shoe
5 inner side
6 rear side
7 actuator
8 mechanism
9 actuating element
10 expansion device
11 brake drum
12 mechanism
13 mechanism housing
14 motor
15 spindle-nut arrangement
16 bearing
17 spring means
18 spring bridge
19 actuating lever
20 spring limb
30 parallel guide
31 guide pin
32 guide pin
33 stop
34 stop
35 guide bush
36 guide bush
37 spring means
Ax axial direction (axis of rotation of the wheel)
a1, a1' lever arm
a2, a2' lever arm
B expansion movement
ΔS elasticity (at least 1 mm)
E arrow direction
F force
H stroke
i transmission ratio
l length (spring bridge—under no load)/l=l'+ΔS
M center line
R radial direction
T tangential direction
WL line of action
Z1, Z2 center

The invention claimed is:

1. A motor vehicle drum brake module which can be operated by an electric motor, wherein an expansion device is arranged so as to float and so as to be approximately central between two brake shoes,
wherein the expansion device comprises at least two mechanism levers articulated to each other and each supported on a brake shoe,
wherein at least one of the mechanism levers of the expansion device is coupled to an actuating element of an actuator, which is arranged together with a rotation-translation converter on a rear side of an anchor plate,
wherein the actuator system serves to ensure that the brake shoes carry out a uniform, translationally directed expansion movement, subject to a transmission ratio, in the direction of the brake drum,
wherein at least one of the mechanism levers has at least one spring element, which can be elastically reversibly deformed in a defined manner by the brake application force, and
wherein the at least one spring element is designed as a spring bridge with a length l and, at one end, has a receptacle for resting on a part of a first brake shoe, and an actuating lever is articulated pivotably to an opposite end of the spring bridge from said receptacle, said lever having, on the one hand, a first lever arm with a point of intersection with the actuating element of the actuator, and, on the other hand, having a second lever arm having a receptacle for a part of a brake shoe.

2. The motor vehicle drum brake module which can be operated by electric motor, as claimed in claim 1, wherein the at least one spring element is formed from spring-elastic steel material.

3. The motor vehicle drum brake module which can be operated by electric motor, as claimed in claim 1, wherein the at least one spring element is stressed in a linear region of its force/displacement characteristic (Hooke's range).

4. The motor vehicle drum brake module which can be operated by electric motor, as claimed in claim 1, wherein the second lever arm is made shorter than the first lever arm, and the two lever arms are dimensioned so as to be shorter than the length of the spring bridge.

5. The motor vehicle drum brake module which can be operated by electric motor, as claimed in claim 1, wherein the lever-type expansion device with its receptacles is arranged without a housing between the brake shoes, being arranged loosely or in a clamped manner and so as to be mounted in an articulated manner.

6. The motor vehicle drum brake module which can be operated by electric motor, as claimed in claim 1, wherein the lever-type expansion device is designed as a module that can be handled separately.

7. The motor vehicle drum brake module which can be operated by electric motor, as claimed in claim 1, wherein there is a linear line of action of force between the joint and the receptacle of the spring bridge, wherein, at least in the region of an arcuately curved spring limb, a cross section of the spring bridge is arranged substantially completely spaced apart from this line of action and is provided with a defined bending moment of resistance.

8. The motor vehicle drum brake module which can be operated by electric motor, as claimed in claim 1, wherein the coupling between the actuating element and the actuating lever of the expansion device is positioned symmetrically in the region of a center line M between receptacles of the brake shoes.

9. A motor vehicle drum brake module which can be operated by electric motor, wherein an expansion device is arranged between two brake shoes,
wherein the expansion device is coupled to an actuating element of an actuator, which is arranged together with a rotation-translation converter on a rear side of an anchor plate,
wherein the actuator system serves to ensure that the brake shoes carry out a uniform, translationally directed expansion movement, subject to a transmission ratio, in the direction of the brake drum,
wherein the actuator is guided so as to be movable to a limited extent in relation to the rear side of the anchor plate and parallel to an axial direction Ax and is mounted in an elastically preloaded deflectable manner on the anchor plate.

10. The motor vehicle drum brake module which can be operated by electric motor, as claimed in claim 9, wherein the actuator is assigned a parallel guide, which is positioned parallel to the axial direction Ax.

11. The motor vehicle drum brake module which can be operated by electric motor, as claimed in claim 10, wherein the parallel guide has at least two fixed-location guide pins and at least two movable guide bushes for receiving the guide pins.

12. The motor vehicle drum brake module which can be operated by electric motor, as claimed in claim 11, wherein the guide pins are assigned correspondingly positioned stops for limiting parallel movement.

13. The motor vehicle drum brake module which can be operated by electric motor, as claimed in claim 9, wherein at least one spring means is clamped in an elastically preloaded manner in the force flow path of the brake application force between the actuator and the anchor plate.

14. The motor vehicle drum brake module which can be operated by electric motor, as claimed in claim 9, wherein a plurality of spring means with an identical or different spring characteristic are provided in a staggered series and/or parallel arrangement in order to allow adaptation of the spring characteristic.

15. The motor vehicle drum brake module which can be operated by electric motor, as claimed in claim 13, wherein the spring means is designed as a wave spring.

16. The motor vehicle drum brake module which can be operated by electric motor, as claimed in claim 2, the at least one spring element is stressed in a linear region of its force/displacement characteristic (Hooke's range).

17. The motor vehicle drum brake module which can be operated by electric motor, as claimed in claim 14, wherein the spring means is designed as a wave spring.

* * * * *